Figure 1:
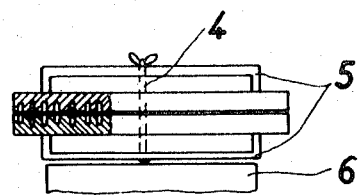

United States Patent [19]
Horn et al.

[11] 3,859,050
[45] Jan. 7, 1975

[54] DEVICE FOR BIOCHEMICAL AND ENZYMATIC ANALYSIS

[76] Inventors: Anton Horn, 20, Oberdorf, Jena-Wollnitz, District of Gera; Klaus Thielmann, 5, Sonnenbergstrasse, Jena, District of Gera, both of Germany; Otto Pfeifer, deceased, late of 32, Hermann-Lons-Strasse, Jena, Germany; Klaus Schilling, Siedlung 13, Bad-Klosterlausnitz, District of Gera, Germany

[22] Filed: May 1, 1972

[21] Appl. No.: 251,535

[52] U.S. Cl. ............... 23/253 R, 23/230 B, 23/259, 195/127
[51] Int. Cl. ..................... G01n 33/16, G01n 21/24
[58] Field of Search ............ 23/253, 230, 292, 259; 195/103.5 R, 127

[56] References Cited
UNITED STATES PATENTS 3,211,645  12/1965  Ferrari .............................. 23/230 B
3,713,779  1/1973  Sirago et al. ...................... 23/230 B

*Primary Examiner*—R. E. Serwin

[57] ABSTRACT

In the course of a biochemical analysis, microliter volumes of a reagent and a sample are mixed with one another for reaction. Such volumes are obtained by use of two respectively dimensioned identical plates, being provided with cavities on those faces, which are to contact the other one. When said two plates are brought in close contact, said cavities, being loaded with samples or reagents, form reaction cells. The mixture is obtained by vibrating the entire device. Each cavity may be surrounded by circular grooves for preventing confluence of solutions from neighbouring cavities. Alternatively, the contact faces of the plates, being provided with said cavities and said grooves, are smoothly covered by conformal foils, which are used for one test operation only, and are thrown away thereafter.

3 Claims, 5 Drawing Figures

DEVICE FOR BIOCHEMICAL AND ENZYMATIC ANALYSIS

This invention concerns a device for and a method of carrying out biochemical, particularly enzymatic analysis, by means of which enzyme activities, concentrations of substrates or coenzymes in the ultra-micro range are measured. In the course of such an analysis, a reagent and a sample react with one another after having beem mixed, the resulting solution is at least partially transferred to a substratum for evaluation.

Because of their high specifity and sensitivity, enzymatic analysis are of outstanding importance in biochemistry, particularly in basic research and applied biochemistry, for example clinical biochemical diagnostics. Enzymatic analysis are utilized for measuring enzymatic activities (activity tests) or determining the concentration of reagent partners (substrate tests).

Concerning the measuring methods, the optical measurements of oxido-reductions reactions are widely used because of their versatility, at which stoichiometric volumes of the coenzymes nicotin amidadenindinucleotide (NAD) or nicotin amidadenindinucleotide phosphate (NADP) are submitted either to a reduction or an oxydation process, which causes respective variations in the light absorbancy in the longwave UV-range (Warburg optical test). The aforementioned measuring principle is also applicable in such cases where said two coenzymes are not directly involved. The enzymatic reactions are coupled to oxidoreductase reactions which in turn depend on NAD or NADP (coupled optical test). Thus, this principle of measuring can be utilized in solving manifold analytic problems. Apart from measuring methods relying on light absorption (at 340 or 366 nm), also fluorimetric methods are used, where the sensitivity of reaction is even increased, when the test solutions are excited by long-wave UV-light. A further known method for analyzing enzymatic reactions makes use of dye-stuffs or leucobase substrata, which in the course of a reaction are either coloured or discoloured. With another method, colour reactions are carried out, at which the final product is obtained by means of a subsequent auxiliary reaction. In the course of still another method, gases, such as oxygen, ammonium hydroxide, carbon dioxide are either consumed or generated. The overwhelming number of enzymatic reactions is evaluated photometrically, in which the exactitude of the obtained measuring result depends on the quality of the used photometers. It is common use to carry out the measurements by successively inserting cuvettes which contain the test solutions into the path of rays of the measuring device: accordingly, the evaluation of enzymatic reactions is generally limited by the sample-time relation. Therefore the efficiency of the enzymatic analysis could only be increased by the application of technically advanced and complicated apparatus, which, however, are very expensive. A further limit, set by the sample volumes, inheres in the heretofore used methods. The conventionally used microcuvettes, which can still be handled, have a smallest possible volume of about 0.3 milliliters. Therefore, it is an object of the present invention to obviate the aforementioned disadvantages in providing a simple technical means for use in operations concerning the measurement of enzyme activities, substrate and coenzyme reactions, which precede the conventional photometric and fluorimetric test evaluations.

It is a further object, to minimize the reagent and sample requirements. It is still a further object to remarkably increase the efficiency of the measuring operation (sample-time relation). And finally it is an object to decisively reduce the costs involved in enzymatic analysis. Accordingly, the present invention is concerned with a method of and a device for mixing microliter volumes of reagents and samples, at least one of the two partners being in solution, by vibrating said samples and reagents, the faces of which contact one another. Thus it is feasable to quantitatively and/or qualitatively analyze test volumes of less than 5 microliters. It is, of course, understood that the reagents involved may contain several components. The reaction conditions may be chosen in a manner that any preselected threshold value can be set, above or below which the test results can be detected either as positive or as negative. Usually two thresholds are set per test. The test solutions, which are transferred on filter paper, are subsequently quantitatively evaluated by photometers or fluorimeters under incident or transcident light. Two plates of a hard, opaque or transparent material, preferably plastics, are symmetrically provided on one of their faces with cavities, thus when said two plates are respectively placed on one another said cavities form reaction cells, which are surrounded by grooves, also provided in both plates. By means of screws and metal discs, the two plates are tightly pressed on one another, subsequently the entire device is mounted on a vibrator. With a modified form of the invention, said two plates consist of a transparent material, two further plates, being provided with bore holes, are placed on opposite sides of said first two plates. As said bore holes being applied in the positions of the underneath reaction cells, this embodiment permits a direct photometric evaluation. The practical sense of the invention is easily to be understood, if one considers the large number and series of enzymatic analysis, which have to be carried out in biochemical analytics, for example enzyme preparations, enzyme purifications, and molecular weight determinations, diagnostic and epidemiologic investigations (both being required by clinical biochemistry and the preventive health service), etc. The invention permits the handling of a large number of test sets at a minimum of time and a considerable reduction in reagent requirements by more than two orders. As the reagents involved are in most cases very expensive, the reductions in costs per individual test are considerable. The invention also means a reduction in time, and the costs involved in obtaining the basic laboratory equipment are likewise low, thus enabling even poorly equipped laboratories to carry out enzymatic analysis. The advantage, obtained by the inventional method and device can be convincingly explained by referring to the clinical biochemical diagnostics. Here it must be inserted that enzyme diagnostics and respective procedures are of outstanding importance in concern of both, an early diagnosis and the control of the course of a disease. Every day, a great number of such procedures are carried out in every clinic laboratory. Heretofore, 5 to 10 milliliters of venous blood had to be taken for enzymatic analysis from persons under test. The investigations (examinations) are comparatively time and costs consuming. With the inventional device and method, the costs per test are reduced to 1 percent. The time now required will be remarkably lower. Without the help of complicated technical means, the test results will be at the doctor's disposal in a few minutes. A great number of tests can be carried out simultaneously. As the sample volumes required for individual investigations being minimal, capillary blood from the finger pulp suffices, even when several enzymes have to be detected. Thus the troublesome venous punctures are avoided for the patient, which is not only of paramount importance if one considers examinations on children, and serial examinations in the frame of the preventive health service, but also means a further reduction in costs. By virtue of the inventional method and device, large scale epidemiological examinations can be carried out independent of special laboratories. Such examinations can, for example, be in connection with the known serial screenings. With a preferable embodiment of the invention, the reagents and samples are included in foils, which in form equal the contact faces of the aforementioned plates. Thus the pre-pared reagents can be made available for the analyst in each desired form and composition; furthermore, in said embodiment the solutions are prevented to contact the plates. Moreover, one operational step is saved, namely the pippetting of the reagents during the examinations in the laboratory. After use, the foils can be thrown away.

Figure 4:
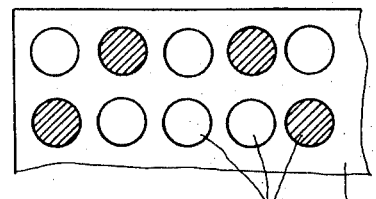
Figure 2:
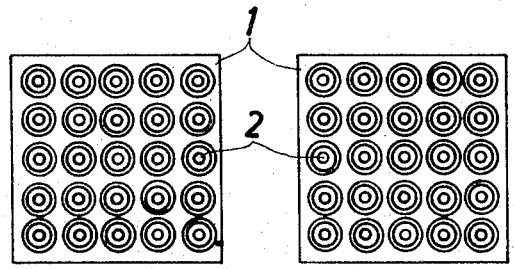
Figure 3:
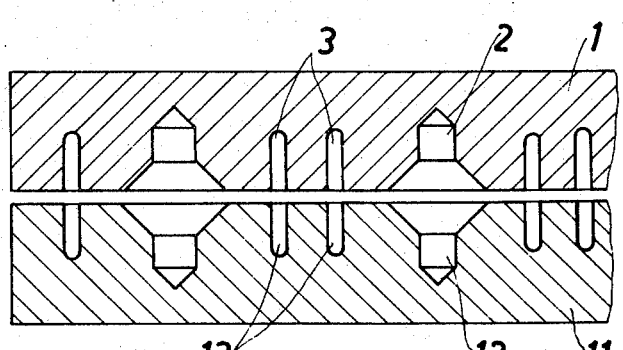
Figure 5:
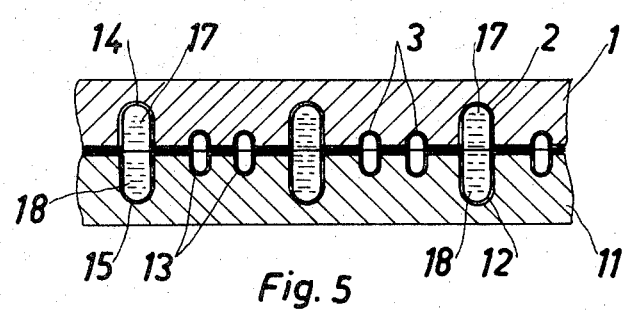

In order that the invention may be more readily understood, reference is made to the accompanying drawings, which illustrate diagrammatically and by way of example two embodiments thereof, and in which FIG. 1 shows a front view partly a sectional view of the inventional device, mounted on a vibrator, FIG. 2 shows the inventional device in top view, FIG. 3 represents a part of a sectional view of the device, FIG. 4 shows a piece of filter-paper with sample spots thereon, and FIG. 5 represents a longitudinal section through a second embodiment.

Referring now in more detail to FIGS. 1–3, two plates 1, 11 consisting of hard material, preferably plastics, are each provided with cavities 2 and 12 for receiving the reagent and sample solution, respectively. The neighbouring cavities are spaced about one centimeter. Each cavity is surrounded by circular grooves 3, 13. By means of a screw 4 and two brackets 5, the two plates are tightly fitted together in a manner that the cavities 2 and 12 form reaction cells 2/12 and the grooves 3 and 13 receptacles 3/13. The volumes of each of said reaction cells 2/12 is about 10 microliters. The plates 1, 11 have to be large enough for a desired number of reaction cells 2/12. Plates, containing 20 to 120 cells have proved to be particular advantageous. The procedure is started by loading the cavities in the one plate with the samples, (the individual volumes being 5 microliter or less, which is achieved by employing, for example, mechanical micropipettes or microburettes) and the cavities in the other plate, with the reagents. Subsequently, the plates are placed together as aforedescribed. The reactions are initiated simultaneously. The two partners, reagent and sample, are mixed by operating a vibrator 6. The tight and conformal fitting of the two plates 1, 11 on one another is ensured by two pins (not shown) and the screw 4, thus preventing any leakage, moreover, the receptacles 3/13 surrounding each reaction cell, prevent the confluence of mixtures from different cells. Thereafter, the mixtures are incubated at a suitable temperature for an adequate time. Finally, the two plates are disengaged by an operation reverse to the aforedescribed, and filter-paper 7 is placed between said two plates, which are subsequently pressed on one another; by a few vibrations or shakes, the mixtures are transferred onto the filter-paper 7, where it provokes spots 8. The mixtures are evaluated by exposure to UV-light when reactions controlled by NAD or NADP, are concerned. The fluorescence of the reduced forms is thereby exploited, being either developped or eliminated. If colour reactions are concerned, the colour intensity of the visible spots 8 is utilized for indication. The paper used therefore, is either pre-treated with a respective colour reagent, or the indicator means are sprayed on. The test conditions are chosen in the following manner: above or below a set threshold value the presence of either an enzyme or a substrate can be detected as a fluorescence effect or the fading thereof, or of a colour effect. According to the present invention, and if a critical threshold value can be selected, the detection procedure is speeded up and simplified. In other words, the threshold values may be so selected in the course of a diagnostic or epidemiological investigation as to lie within the critical diagnostic range, thus the detection of the pathologic or suspicious cases being facilitated.

Furthermore, the following semi-quantitative principle can be realized. The mixtures in the cavities of one of the two plates, after having been submitted to incubation for some time, will be transferred to filter-paper, whereas the incubation of the remaining mixtures, held in the cavities of the other plate, will be continued for evaluation at a later time. Accordingly, high enzyme activities (above a preselected threshold value) are detected first and lower enzyme activities (below a preselected threshold value), later on. Thus, in general, diagnostic rules are fully satisfied. The application of the "one and/or two threshold principle" permits the detection of conspicuous enzyme activities and substrate concentrations at comparatively low technical costs and under simple operation conditions. To obtain an exact evaluation of the results of the analysis, an accessory device is employed to a photometer; at which the filter paper 7 is inserted for spotwise evaluation into the path of rays between a light source and a photocell, both belonging to the not shown photometric measuring device. In the course of the evaluation, the absorption or the fluorescence is measured, the measuring results being a linear function of the indicator volume, which in turn corresponds to the enzyme activities or to the substrate volumes.

In FIG. 5, the two plates 1, 11 are shown again, comprising reaction cells 2/12 and receptacles 3/13. In contradistinction to the aforedescribed representations, two foils 14 and 15 are placed between and closely attached to the respective plates 1 and 11. Said foils 14 and 15 comply in form with the contact faces of said plates 1 and 11, respectively. Thus the indentations 14 and 15, corresponding to the cavities 2 and 12 of said plates 1 and 11, are loaded with the reagent and the sample solutions, respectively. The operation of the vibrator 6 (FIG. 1) causes the samples and reagents to mix with each other.

It lies within the scope and the of the invention that the reaction cells can be modified as desired in respect to form, formation, and size. However, it is advantageous to have the volumes of the reaction cells in the microliter range, for the sake of most effectively exploiting a minimum of substances.

It is understood that the method and device are not of course restricted to enzyme analysis.

Furthermore, clamping means, which are known perse, can be provided for holding the plates in close contact.

We claim:

1. A device for carrying out biochemical analysis in the ultra-micro range, particularly for mixing microvolumes of at least one sample with at least one reagent, comprising
- two plates for being assembled in close contact on one another,
  - each of said two plates having a contact face being provided with cavities of substantially the same size;
  - the cavities in the one of said two plates receiving the sample;
  - the cavities in the other of said two plates receiving the reagent;
  - said two plates being assembled and said cavities being arranged in a manner that the cavities in the one of said plates register with the cavities in the other of said plates, thus forming reaction cells;
- one vibrator, and
- clamping means for ensuring the secure mount of the assembled
  - plates on said vibrator;
  - said vibrator being adapted to shake the assembled plates and to mix said sample and said reagent, both enclosed therein.

2. Device as claimed in claim 1,
wherein said cavities in said two plates being concentrically surrounded by grooves.

3. Device as claimed in claim 2,
wherein at least one of the contact faces of said two plates is conformally covered by a foil, thus possessing indentations, corresponding to the cavities in the one contact face.

* * * * *